United States Patent [19]

Gebelein et al.

[11] Patent Number: 4,477,156

[45] Date of Patent: Oct. 16, 1984

[54] REFLECTING TELESCOPE WITH CORRECTING LENS

[75] Inventors: Rolin J. Gebelein, 291 Martin Rd., Santa Cruz, Calif. 95060; David Shafer, Fairfield, Conn.

[73] Assignee: Rolin J. Gebelein, Santa Cruz, Calif.

[21] Appl. No.: 316,134

[22] Filed: Oct. 29, 1981

[51] Int. Cl.³ .................... G02B 23/02; G02B 17/08
[52] U.S. Cl. ................................ 350/503; 350/443; 350/556
[58] Field of Search ............... 350/503, 301, 435–436, 350/442–443, 444, 410, 504–505, 537, 412, 518, 552, 554–556

[56] References Cited

U.S. PATENT DOCUMENTS 3,860,940  1/1975  Baker ................................. 350/301
4,350,411  9/1982  Rogers ............................... 350/412

FOREIGN PATENT DOCUMENTS 158698  10/1963  U.S.S.R. ............................. 350/442
161529   3/1964  U.S.S.R. ............................. 350/442
243878  10/1969  U.S.S.R. ............................. 350/442

OTHER PUBLICATIONS

Cox, R. E. "A Ten-Inch Sperical Reflector with a Negative Correcting Lens Sky & Telescope", 10-1962, pp. 231–235.
Berry R. Telescope Making, "New Tonian Telescopes", vol. 9, pp. 6–13, 1980.
Rosin, S., "Ritchey Cretien Corrector System", App. Otics, 1966, pp. 675–676.
Wynne, C. G. "Field Correctors for Large Telescopes", App. Optics, 1965, pp. 1185–1192.
Harmer et al., "A Single-Lens, Small-Field Paraboloid Field Corrector", The Observatory, vol. 96, 12-1976, pp. 239–241.
Rosin, S. "Corrected Cassegrain System", App. Optics, 1964, pp. 151–152.
Maksutov, D. D., "New Catadioptric Meniscus System", Jr. Opt. AM., 1944, pp. 270–284.

Primary Examiner—William R. Ponter
Attorney, Agent, or Firm—Ronald E. Grubman; Joseph H. Smith

[57] ABSTRACT

A reflecting telescope is provided in which a meniscus lens corrects for coma of the primary parabolic reflecting mirror, and also for coma and spherical aberration of an eyepiece, when an eyepiece is used. The meniscus lens may be formed from a plano-concave lens and a plano-convex lens positioned with their planar sides mutually parallel.

11 Claims, 4 Drawing Figures

REFLECTING TELESCOPE WITH CORRECTING LENS

BACKGROUND OF THE INVENTION

This invention is concerned generally with reflecting telesopes, and more particularly with a correcting lens for such telescopes.

A common telescope widely used by amateur astonomers and professional astronomers is the Newtonian reflecting telescope. In such telescopes a parabolic mirror is positioned at one end of a supporting tube to collect incoming light and focus that light to an image point which can be examined by the viewer. Typically, the light is reflected by a small, flat mirror out to a region at the side of the tube, so that the image may be viewed through an eyepiece mounted at the side of the telescope tube. In recent years Newtonian telescopes of this type have become available with much larger apertures than heretofore. For example, telescopes with an aperture speed of f/2.9 are now commercially available. These fast Newtonian telescopes present aberration problems that were non-existent or less important with optically slower telescopes of this kind.

One aberration is "coma", an aberration which affects light rays off the optical axis of the telescope; in particular, stars which are off-axis take on the appearance of comets, having a tail extending outwardly from a central bright spot. A detailed discussion of the coma aberration for a spherical lens can be found in the textbook "Fundamentals of Optics" by Jenkins and White, published in 1957 by McGraw-Hill Book Company. An excellent discussion of the coma aberration of parabolic mirrors may be found in "Telescope Making" (ISS N 0190-5570), No. 9, Richard Berry, Editor; published in the Fall Quarter of 1980 by Astromedia Corporation. A discussion may also be found in the "Handbook of Military Infrared Technology," William L. Wolfe, Editor; published in 1965 by the Office of Naval Research Department of the Navy, Washington, D.C.

In addition to the problem of coma of the parabolic mirror, it has been found that the use of any eyepiece with the fast Newtonian telescopes generates additional aberrations by virtue of the eyepiece itself. These aberrations are both spherical aberration and coma. The resulting image quality is therefore greatly degraded.

A great body of literature exists concerning the correction of aberrations in lens and mirror systems of all kinds. In general, correction of aberrations involves the placing of a number of correcting lenses in the optical system, the various correcting lenses being designed to more or less cancel out the most objectionable aberrations of the other lenses in the system, including new aberrations introduced by the correcting lenses themselves.

A reference of particular interest with respect to the present invention is the paper entitled "New Catadioptric Meniscus Systems" by D. D. Maksutov, published in the *Journal of the Optical Society of America*, Volume 34, No. 5, May 1944. The Maksutov paper is largely concerned with the use of meniscus lenses to correct aberrations of spherical reflecting mirrors used in telescopes. The paper does not deal with correcting aberrations of parabolic reflectors, nor with correcting aberrations of both reflectors and viewing lenses (eyepieces) in a telescope.

Other references showing coma correction are: "Field Correctors for Large Telescopes," Applied Optics, September 1965, by C. G. Wynne; "Corrected Cassegraim System," Applied Optics, January 1964, by Seymore Rosin; and "Ritchey Chretian Corrector System," Applied Optics, April 1966 by Seymore Rosin.

SUMMARY OF THE INVENTION

In accordance with the illustrated preferred embodiments, the present invention provides a Newtonian type reflecting telescope, preferably using a primary parabolic reflecting mirror, in which a meniscus lens is used to simultaneously correct for coma aberrations of both the primary reflector and of an eyepiece lens used for viewing the image, as well as for spherical aberration of the eyepiece. In some embodiments, the meniscus correcting lens is moveably mounted so that in one position it is used in connection with a viewing eyepiece, correcting the above-mentioned aberrations of primary reflector and eyepiece; while in a second position this same correcting lens is used with a lensless camera mounted on the telescope, in this case properly correcting the system only for the coma of the primary reflector. In other embodiments the meniscus lens is formed from a plano-concave lens and a planoconvex lens positioned with their planar sides mutually parallel. In all cases, the field of view, and magnification, of the telescope remains unchanged or only negligibly changed.

DETAILED DESCRIPTION OF THE PREFERRED EMBODIMENT

Figure 1:
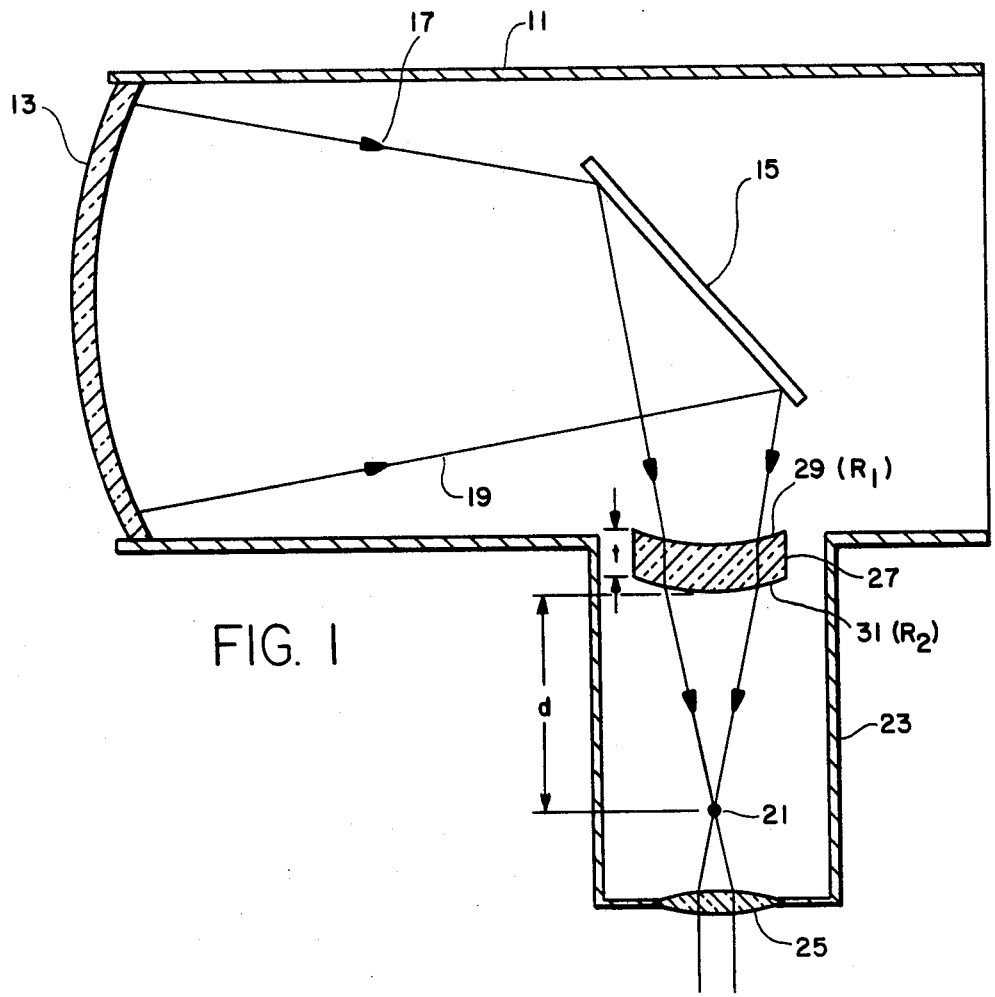
FIG. 1 is a schematic illustration of a telescope utilizing a correcting meniscus lens.

In FIG. 1 there is shown a telescope which may be of the type known as the "Deep Sky Telescope" available from Sky Research in Santa Cruz, Calif. The telescope has a housing tube 11, at the back end of which is mounted a primary reflecting mirror 13 which is preferably a parabolic reflector. For purposes of illustration, parabolic reflector 13 will be taken as having a diameter of 8" and a speed of f/2.9 (which is, in fact, the reflector utilized in the Deep Sky Telescope mentioned above). Incoming parallel light is reflected by mirror 13 back down tube 11 to a plano diagonal secondary mirror 15, as illustrated by a pair of rays 17 and 19. Mirror 15 typically has an elliptical shape with a minor axis of about 2.8". The distance between parabolic reflector 13 and planar reflector 15 is typically about 15". (Note that the various elements shown in the drawings are not necessarily drawn to scale.)

Light reflected from mirror 15 converges to a focal point 21 near the end of a focuser tube 23. With the illustrative parabolic reflector 13 and secondary mirror 15 described above, focus 21 is a distance of about 8.2" from the center of secondary mirror 15.

The image formed at focus 21 may be viewed through an eyepiece 25 such as a 20 mm focal length Erfle eyepiece. Eyepiece 25 is mounted to focuser tube 23 in a manner well known in the art, e.g., in the manner of the Deep Sky Telescope referred to above.

The image formed by telescopes of the type just described is distorted because of numerous aberrations in the optical elements of the system. For example, parabolic reflecting mirrors, especially fast mirrors such as f/3 or faster, exhibit a great deal of coma aberration which gives stars the appearance of a comet, having a long tail extending from a central bright spot. Additionally, the use of eyepieces, such as the Erfle eyepiece described above, in such fast telescopes introduces both coma and spherical aberration into the system, due to the extremely fast light cone entering the eyepiece.

In accordance with the principles of the present invention, it has been found that the coma and spherical aberrations of a fast Newtonian telescope can be eliminated or greatly reduced in a very simple manner by the use of a meniscus correcting lens 27 interposed in the converging rays reflected from mirror 13; by a meniscus lens is meant a lens having front and back surfaces concave in the same direction. In FIG. 1, the faces of lens 27 are concave toward parabolic mirror 13. By selecting the radius of the front surface 29 (hereinafter to be designated "R1") and the lens position to collimate the light within lens 27, various aberrations such as spherical aberration, coma astigmatism, and color are introduced into the system. However, if the radius of back surface 31 of meniscus lens 27 (hereinafter called "R2") is then selected to be equal to R1, both spherical aberration and color introduced by surface 29 will be exactly cancelled when the rays emerge from surface 31 of lens 27. However, the coma introduced by surface 31 will not cancel the coma introduced by front surface 29; the net amount of coma introduced by lens 27 will, in fact, vary linearly with the lens thickness. Furthermore, the coma introduced by meniscus lens 27 is of the opposite and proper sign to permit cancellation of the combined coma of parabolic mirror 13 and eyepiece 25.

The above described system utilizes a meniscus lens which will correct the system for coma of the parabolic mirror and coma of the eyepiece. However the system is left uncorrected for spherical aberration of the eyepiece. In accordance with the principles of the present invention however, the same meniscus lens 27 may be utilized to eliminate or greatly reduce the spherical aberration of the eyepiece. This may be simply accomplished by positioning meniscus lens 27 so that light incident on surface 29 is not collimated inside meniscus lens 27. In this case the spherical aberration introduced by back surface 31 will not cancel that introduced by front surface 29, the net spherical aberration of lens 27 thereby being selectable (and of proper sign) to off-set the spherical aberration of eyepiece 25. This enables the same correcting meniscus lens 27 to correct for the spherical aberration and coma of the eyepiece 25, as well as the coma of the parabolic reflector 13.

In this system, according to the invention, it has been found that the field of view, and magnification of the telescope remain substantially unchanged upon introduction of the meniscus corrector in as much as the meniscus is essentially a zero power element simply behaving as a uniformly bent concentric window in this respect. This effect is important to preserve the large field of view desired in fast telescopes. Such a meniscus also preserves the image brightness, which is of special importance for viewing nebulae, galaxies and other deep-sky objects, all viewable by a low f-number, fast telescope.

Several examples of systems utilizing the principles of the present invention will now be discussed, in which the placement of the meniscus lens will be described in terms of a parameter "d" defined as the distance from rear surface 31 of meniscus lens 27 to the focal point 21 of reflector 13. It has been found that the introduction of meniscus lens 27 into the Newtonian system displaces the focal point toward viewing lens 25 by a distance almost exactly equal to the thickness of the meniscus lens; this displacement is the same (to first order) whether or not the light rays are collimated within the meniscus lens. For convenience, the thickness of the meniscus correcting lens will hereinafter be designated by the symbol "t". All of the various lenses discussed hereafter are available from Sky Research in Santa Cruz, Calif.

With specific reference to a parabolic reflecting mirror of 8" diameter and speed of f/2.9, and a 25 mm f.l. (focal length) eyepiece, meniscus lens 27 may be selected so that $R1=R2=1.75''$, $t=1.0$ and $d=2.0''$. With these parameters, correction will be obtained for spherical aberration and coma of eyepiece 25 and coma of parabolic mirror reflector 13. In addition, with proper design of the meniscus corrector eyepiecs of other focal lengths, for example ranging from 10 mm to 40 mm or more, may be corrected within the system by using such a meniscus mounted on a moveable slide to match its transverse position to the correction required by the eyepiece being used at the moment. For example, the meniscus cited above will give good correction when used with eyepieces ranging from approximately 16 mm f.l. to 32 mm f.l. when the meniscus is positioned by using the slide from about $d=3.0''$ to $d=1.0''$. In an alternate embodiment, using the same 8", f/2.9 primary reflector, the system parameters may be selected as: $R1=R2=2.125$, $t=0.25''$ and $d=4.25''$. With these parameters correcting lens 27 corrects for the coma of parabolic mirror 13, but does not introduce any spherical aberration into the system. Importantly, the meniscus corrector here utilizes a relatively thin configuration to limit astigmatism, and does not require substantially thick cross section as would be required of "Maksutov-type" correctors which must correct the large amounts of spherical aberration produced by the spherical primary mirrors used in the systems discussed by Maksutov; here, the parabolic mirror is completely free of spherical aberration by its nature. This coma correction without introduction of spherical aberration is useful when it is desired to perform prime-focus photography, which is effected by removing eyepiece 25 and positioning a strip of film at focus 21. An advantageous feature of this embodiment is that the displacement of focal point 21 by meniscus lens 27 (described above) provides additional space for positioning of a camera and film approximately at the focal plane of reflector 13.

Figure 2:
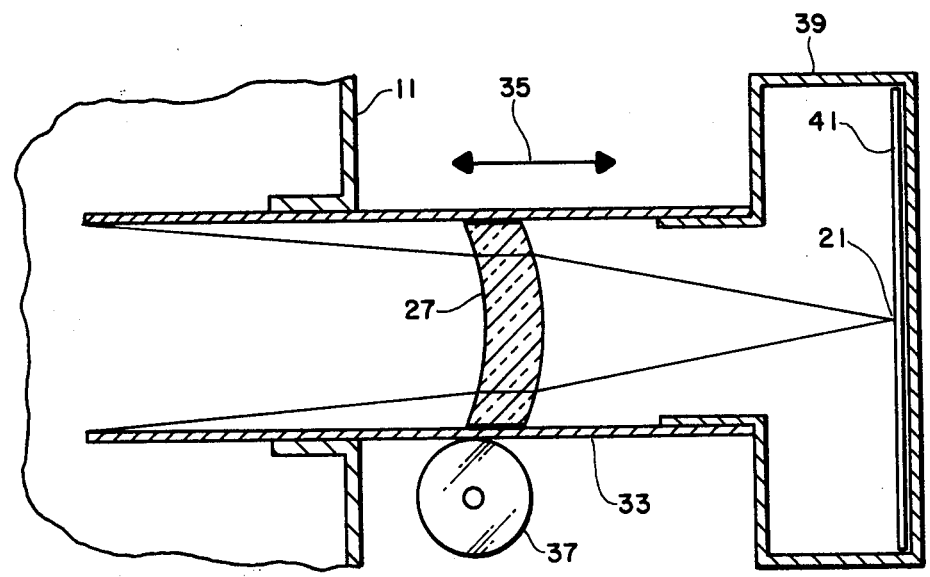
FIG. 2 shows a meniscus lens mounted in a focuser tube for use in prime-focus photography.
Figure 3:
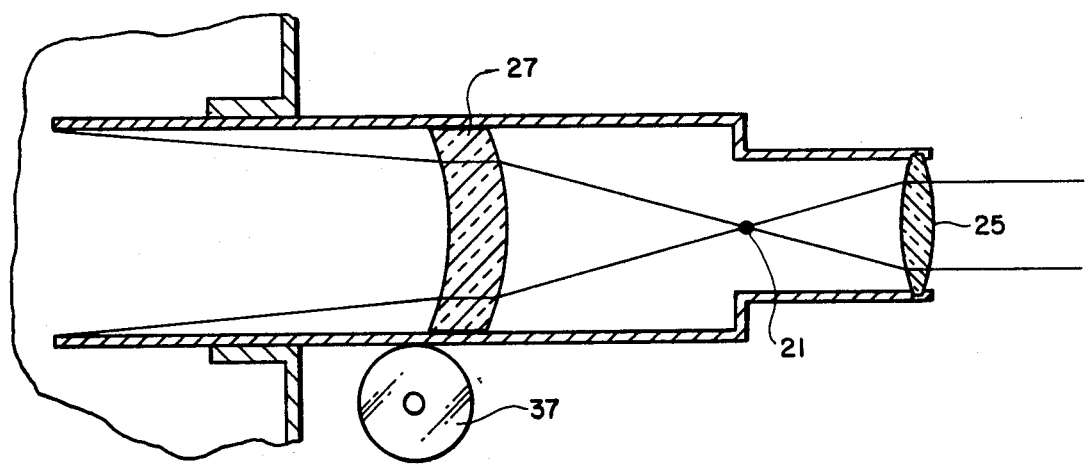
FIG. 3 shows the focuser tube and lens of FIG. 2 in a different position for use with a viewing lens.

In the embodiments of FIGS. 2 and 3 the principles of the invention are advantageously exploited in conjunction with a movable focuser tube which provides a certain amount of travel between the viewing end of the focuser tube and the main telescope tube itself. More particularly a focuser tube 33 is adjustable in the traverse direction indicated by arrows 35 in response to motion of a focuser knob 37. Such a focuser tube is the Model 680 available from Meade Corporation and others, which has approximately a 3" travel. Meniscus lens 27 is fixed to the interior of focuser tube 33 by use of a suitable lens cell. For prime-focus photography use, a lensless camera 39 is used to position a strip of film 41 in the focal plane of the telescope so that focal point 21 falls on the film. For the particular preferred systems described above meniscus lens 27 should have the parameters R1=2.0", R2=2.0", and t=0.5". In this case focuser tube 33 is the "down" position so that d=3.25". In the configuration of FIG. 3 focuser tube 33 has been racked to the "up" position carrying meniscus lens 27 closer to the focal point, for example so that d=1.25". At the same time, camera 39 has been removed and replaced by eyepiece 25, for example of the type described above. It has been found that when meniscus lens 27 is thus moved closer to the focal point, the optical rays are no longer collimated within the meniscus lens, resulting in the introduction of additional coma and also of spherical aberration. For the parameters just described these are of the proper amount and sign to provide useful correction to the system for the spherical aberration and coma introduced by eyepiece 25, as well as for the coma of primary reflector 13. Thus, the same meniscus lens may be advantageously utilized in this system for use with a viewing eyepiece or alternatively for use in accomplishing prime-focus photography. In both cases the system coma (and spherical aberration, if present) are corrected, while introducing only minimal astigmatism since the meniscus thickness is limited.

In the various examples discussed above, the radii R1 and R2 have been taken to be equal. However, it is also possible to utilize meniscus lenses having unequal radii to achieve similar corrections. This freedom is especially useful in cases where it is not possible to vary the lens thickness. However, if the lens position, lens thickness, and image shift are all determined, there are some circumstances where spherical aberration cannot be corrected, regardless of the choice of different lens radii. In such cases, however, one or both of the lens surfaces can be made aspheric, in a manner well known in the art. The resulting reduction of spherical aberration introduced by the meniscus lens then permits the correction for both coma and spherical aberration in the restricted system.

Figure 4:
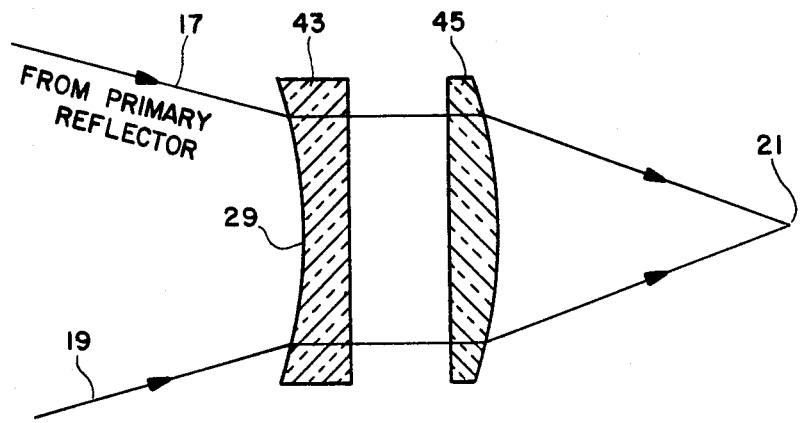
FIG. 4 illustrates the use of a pair of lens to produce the effect of a meniscus lens.

In certain circumstances, the thickness required for meniscus lens 27 to achieve desired aberration corrections may result in a lens which is too costly and/or too heavy. In such circumstances, meniscus lens 27 may be conveniently formed from two separate lenses shown in FIG. 4 as a plano-concave lens 43 and a plano-convex lens 45, positioned with their planar sides parallel. Lens 43 is positioned to achieve collimation of the light rays from the primary reflector after passing through concave surface 29. A desired amount of coma correction and/or image shift may then be achieved by separating the lenses 43 and 45 by the requisite amount. In a practical telescope this is nicely accomplished by fixing lens 43 in the focuser tube, while mounting lens 45 on a moveable slide. The proper position of lens 45 may then be determined by inspection of the image to produce an image exhibiting a minimum amount of coma.

The split meniscus lens technique may be advantageously employed to restrict the size of the diagonal secondary mirror while simultaneously correcting aberrations. This improves system performance by limiting deleterious diffraction and obscuration effects due to the diagonal mirror, and also lessens the cost and weight (size) of the diagonal. This is accomplished, for example, by moving the primary mirror further back in tube 11, e.g. to 19" separation between primary and secondary mirror, instead of 15" (as in the prior example). The focal point is now 4.2" downstream from the diagonal rather than 8.2" (prior example); and the size required of the diagonal mirror to assure full coverage of f/2.9 light cone is only 1.4" on the minor diagonal rather than 2.8", a reduction of 75% in area of the diagonal, which also results in equivalent savings in weight and cost. For example, this feature reduces central obstruction of the system to only 3% compared to 12% for the prior system, with concurrent improvement of diffraction effects modulation transfer (MTF) and contrast level at the image. The reduced size of the secondary diagonal mirror also reduces the objectionable "black-spot" defocused image of the secondary mirror, well-known to telescope users.

By placing the plano-concave half of the meniscus corrector approximately 1.25" inside the focus of reflector 13, and choosing the meniscus radii to be approximately R1=R2=1.5" to collimate, or nearly colimate, light between the two halves of the corrector; and by separating these halves it is possible to "pipe out" the image position to any desired distance. For example, if the two halves of the meniscus are separated by 4" within the focuser tube, the image will be brought out to a focus at approximately the same point as in the prior example which required a diagonal size of 2.8". This technique is especially useful and important as the diameter of primary mirror 13 is increased, for example to 16" or 24". Furthermore, the image may be "piped out" in this manner without reducing the field of view of the telescope. Negative achromats, for example, "Barlow Lenses" commonly used for this purpose in the prior art all do so by increasing the effective focal length of the telescope and thereby diminish the field considerably. In addition, these negative lenses, (and also any positive lenses that might be used to relay real images out to the desired displaced focal point) all tend to detract from the image quality rather than to improve it, as is accomplished by virtue of the correction process described herein.

We claim:
1. A reflecting telescope comprising:
   a housing;
   a parabolic reflecting mirror at one end of said housing for forming a focused image of light incident on said mirror;
   a viewing lens through which a user may view said image;
   a single element meniscus lens located in said housing and configured to simultaneously correct said image for coma aberration of said parabolic mirror and for spherical aberration and coma aberration of said viewing lens.
2. A telescope as in claim 1 wherein said meniscus lens has a concave front surface relative to said parabolic mirror and a convex back surface relative to said parabolic mirror, with the magnitude of the radius of curvature of said concave front surface being equal to the magnitude of the radius of curvature of said convex back surface.
3. A reflecting telescope comprising:
   a housing;
   a parobolic reflecting mirror at one end of said housing for forming a focussed image of light incident on said mirror;
   a meniscus lens having a first position in said housing and being configured to collinate light from said reflecting mirror within said meniscus lens when in said first position to correct said image for coma aberration of said parabolic mirror;
   adjustment means for moving said meniscus lens between said first position and a second position;

said housing adapted to accommodate a viewing lens through which a user may view said image; and said meniscus lens being configured to also correct said image for coma aberration of said parabolic reflecting mirror and for spherical aberration and coma aberration of said viewing lens when in said second position, enabling said telescope to be used in a viewing mode with said viewing lens or in a photographic mode with a camera replacing said viewing lens.

4. A telescope as in claim 3 wherein:

said meniscus lens is further configured to correct for aberrations of any of a plurality of viewing lens, depending on the distance of said second position from said focused image.

5. A telescope as in claim 3 further comprising:

a focuser tube in which is mounted said meniscus lens, said focuser tube being movable to move said meniscus lens between said first and second positions; and a flat mirror positioned in said housing to direct light from said parabolic mirror into said focuser tube.

6. A telescope as in claim 5 wherein said meniscus lens is formed from a plano-concave lens and a plano-convex lens having their planar surfaces in a facing parallel, spaced apart relationship.

7. A reflecting telescope comprising:

a housing;

reflecting means at one end of said housing for forming a focused image of light incident on said reflecting means;

viewing means for viewing said image;

correcting means having a first position in said housing for collimating light from said reflecting means within said correcting means when in said first position for correcting said image for coma aberration;

adjustment means for moving said correcting means between a first position and a second position;

said correcting means being configured to correct said image for coma aberration of said reflecting means and for spherical aberration and coma aberration of said viewing means when in said second position enabling said telescope to be used in a viewing mode with said viewing means, or in a photographic mode with a camera replacing said viewing means.

8. A telescope as in claim 7 wherein:

said correcting means is further configured to correct for aberrations of any of a plurality of viewing means, depending on the distance of said first position from said focused image.

9. A telescope as in claim 7 wherein:

said correcting means comprises a meniscus lens.

10. A telescope as in claim 9 wherein:

said meniscus lens is formed from a plano-concave lens and a plano-convex lens having their planar surfaces in a facing parallel, spaced apart relationship.

11. A reflecting telescope comprising:

a housing;

a parabolic mirror at one end of said housing for forming a focused image of light incident on said reflecting means;

a viewing lens for viewing said image;

a plano-concave lens and a plano-convex lens having their planar surfaces in a facing, parallel, spaced apart relationship, with said plano-concave lens and said plano-convex lens located at positions in said housing and configured to simultaneously correct said image for coma aberration of said parabolic mirror and for spherical aberration and coma aberration of said viewing lens.

* * * * *